(12) United States Patent
Hort

(10) Patent No.: US 8,227,044 B2
(45) Date of Patent: Jul. 24, 2012

(54) PROCESS FOR COATING METALLIC OBJECT WITH A FIBER-CONTAINING LAYER HAVING A ROUGH SURFACE

(75) Inventor: Stefan Hort, Venthone (CH)

(73) Assignee: Hort Coating Center SA (CH)

( * ) Notice: Subject to any disclaimer, the term of this patent is extended or adjusted under 35 U.S.C. 154(b) by 1015 days.

(21) Appl. No.: 11/912,634

(22) PCT Filed: Apr. 28, 2006

(86) PCT No.: PCT/CH2006/000234
§ 371 (c)(1),
(2), (4) Date: Oct. 25, 2007

(87) PCT Pub. No.: WO2006/116888
PCT Pub. Date: Nov. 9, 2006

(65) Prior Publication Data
US 2008/0187717 A1    Aug. 7, 2008

(30) Foreign Application Priority Data
Apr. 29, 2005 (CH) ....................... 0759/05

(51) Int. Cl.
*B05D 5/08* (2006.01)
*A47J 27/00* (2006.01)
(52) U.S. Cl. ...................................... 427/409
(58) Field of Classification Search ............... 427/407.1, 427/409; 220/573.1–573.3, 592.01–592.2, 220/912; 219/245; 126/1 R, 4, 12, 14, 58, 126/273 R–273 A, 211–221, 332–333
See application file for complete search history.

(56) References Cited

U.S. PATENT DOCUMENTS

| | | | |
|---|---|---|---|
| 3,520,747 A * | 7/1970 | McGaughey | .................. 156/153 |
| 5,843,232 A | 12/1998 | Savkar et al. | |
| 6,342,272 B1 | 1/2002 | Halliwell | |

FOREIGN PATENT DOCUMENTS

| | | |
|---|---|---|
| DE | 44 34 425 | 3/1996 |
| EP | 0 358 804 | 3/1990 |
| JP | 59-153877 | 9/1984 |
| JP | 63-216980 | 9/1988 |
| JP | 1-141619 | 6/1989 |
| JP | 7-184785 | 7/1995 |
| JP | 07 184785 | 7/1995 |
| JP | 7-316546 | 12/1995 |
| JP | 8-215055 | 8/1996 |
| JP | 10-025469 | 1/1998 |
| JP | 10-174654 | 6/1998 |
| JP | 2003-276129 | 9/2003 |
| WO | 01/36711 | 5/2001 |
| WO | WO 01/036711 A1 * | 5/2001 |

OTHER PUBLICATIONS

English translation of the International Preliminary Report on Patentability (Form PCT/IB/373) for PCT/CH2006/000234, Oct. 30, 2007, 7 pages.*
International Search Report; PCT/CH2006/000234; Jul. 10, 2006.
JP ER 2008-508047, dated Dec. 22, 2011 (English Translation).

* cited by examiner

Primary Examiner — William Phillip Fletcher, III
(74) Attorney, Agent, or Firm — Cantor Colburn LLP

(57) ABSTRACT

A process for applying at least one layer of material on a metallic object base body of a kitchen appliance includes providing a fibrous material having carbon fibers added to the at least one layer of material before, after, or during the application of that layer. The process further includes subsequently hardening at least one layer of material. After the hardening, there is a rough surface with spatial frequency fractions ranging from 3 $\mu m^{-1}$ to 1000 $\mu m^{-1}$. The at least one layer of material defines a top free surface, and the carbon fibers have fiber ends sticking out of the top free surface. The process further includes producing the rough surface as a free coating surface having self-cleaning and/or anti-adhesive properties.

9 Claims, 2 Drawing Sheets

PROCESS FOR COATING METALLIC OBJECT WITH A FIBER-CONTAINING LAYER HAVING A ROUGH SURFACE

The present invention relates to an object base body provided with a coating, which object base body can be made of metal and is preferably a kitchen appliance in accordance with the preamble of patent claim 1, and a process for applying a layer in accordance with the preamble of patent claim 12.

An object base body in the sense of the invention, which is provided with a coating, is understood to mean not only kitchen appliances, such as, in particular, pans and casseroles, but also linings of ovens, heating plates, e.g. on irons and electric grill plates, panel heating elements and panel radiators etc. The object base bodies need not necessarily be used at elevated temperatures; they can also be used at room temperature or below. At higher temperatures, such as occur in the kitchen area, metallic base bodies will be used. At low temperatures, base bodies made of synthetic materials can also be used. In the case of kitchen appliances with a metallic base body made of aluminum or steel, use is possible at elevated temperatures, i.e. temperatures above 100° C. up to 300° C., without any problem.

BACKGROUND OF THE INVENTION

Kitchen appliances exhibiting an anti-adhesive effect as coated object base bodies are known from EP 0 365 485, EP 0 719 594 and EP 1 048 751. In each case, an anti-adhesive layer is applied as the top layer exhibiting a free surface, that is to say, the layer that in each case is in contact with the foodstuffs to be fried, boiled or stewed.

To achieve a good adhesion of the entire coating to the base body of the kitchen appliance, EP 0 365 485 roughens the base body. A ceramic material, such as an aluminum oxide/titanium oxide powder mixture, is thermally sprayed onto this roughened and heated surface. In EP 0 719 594, a strip-like application of overlapping strips of a hard-material layer is described. EP 1 048 751 admixes diamond crystals into at least one of the layers of the layer package to obtain a hard coating with good thermal conductivity.

SUMMARY OF THE INVENTION

The object of the invention is to manufacture an object base body, in particular a kitchen appliance, provided with a coating, in which good layer bonding is achieved and in which the anti-adhesive effect and self-cleaning can be improved. In a preferred manner, the layer composite should maintain its anti-adhesive and self-cleaning property even at temperatures above 100° C.

The above-named object is solved in that there is applied on an object base body, which can be inter alia metallic, a coating, which exhibits at least one layer, to the layer material of which a fibrous material is added. The layer material is generally paste-like and is hardened in a later process step.

Manufacture of layers that contain fibres is known per se. In the known layers, however, the fibres always lie approximately parallel to the layer top or bottom side, with individual fibres or weaves being used. Weaves are used to make sure that no fibres stick out of the layer surface; i.e. a characteristic of these layers is a smooth surface. Such layers with smooth surfaces are described in EP 1 238 785, JP 07 255 606 and JP 07 184 785.

Contrary to the teachings of the prior art, the invention is now no longer looking for a smooth surface; on the contrary, the fibres are to lie in the layer in such a way that peaks and troughs with spatial frequency fractions between 3 $\mu m^{-1}$ and 1000 $\mu m^{-1}$ result.

The fibres can now be added to the layer material before layer production. The mixture is then applied as a "fibre paste" on the base body or on one or more layers already present on the base body, and then hardened. The fractions of fibrous material and layer material will be chosen in such a way that the fibres form a "felt" and is held together by layer material hardened later. A rough surface has then resulted. This rough surface, if it is the free surface of a coating, that is to say, e.g. in the case of a kitchen appliance, the top layer, which comes into contact with the item being boiled or fried, gives rise to an anti-adhesive effect and/or a self-cleaning effect virtually independently of the layer material. The generation of these two effects is explained on the basis of FIG. 1.

If little layer material is used, the regions of reduced base material contribute to the roughness. If a relatively large amount of layer material is used, the roughness is caused primarily by the fibre ends, which cause the surface to "bulge".

To a certain degree, the roughness achieved for given material properties of the layer material and of the fibres depends on inter alia when the fibres are introduced into the layer. If first the fibres are applied and then the layer material, or the fibres are added to the layer material before coating, then, due to the surface tension of the still paste-like layer material, the fibres will always be coated, if only thinly, with layer material, while the fibre ends project markedly. If, on the other hand, the fibres are applied on the paste-like layer material only after it is applied, then the fibres will sink into the layer material and/or can be pressed into it by passing over with a spatula, pressing in with a pressure plate etc., but fibre ends protruding from the layer surface will always be present. These protruding fibre ends provide a good meshing effect if a further layer is applied on this layer. Since, in a preferred manner, carbon fibres are used, there can, in the top free surface also, be fibre ends present that protrude beyond this top free surface; carbon fibres are not hazardous to health. Since the protruding fibre ends are very short, they will moreover withstand mechanical loadings without breaking off. Sticking-out fibres contribute to an increase in the self-cleaning and in the anti-adhesive effect.

FIG. 1 shows on the top left a smooth, horizontal surface 40 of an object 41, with a liquid drop 42. This liquid drop 42 is generally a water drop but can, in particular in the case of kitchen appliances, also be an oil drop or sauce drop. On the smooth surface are several dirt particles 43. In the case of a water drop 42, the drop has on the smooth surface 40 a contact angle $\beta_g$ from 40° to 70°. The contact angle $\beta_g$ is the angle between the smooth surface 40, on which the drop lies, and a tangent $T_g$ to the drop surface $M_g$ at the contact edge of the drop 42. If the smooth surface 40 is now inclined by an angle α, as shown on the top right in FIG. 1, the drop 42 deforms but continues to adhere together with the dirt particles 43.

In the case of a rough surface 47, as shown on the bottom left in FIG. 1, the contact angle $\beta_r$ of the tangent $T_r$ to the drop surface $M_r$ at the contact edge of the drop 42 increases. The contact area of the drop 42 has decreased, as a result of which the holding force on the surface 47 has also been decreased. The drop 42 has moreover adopted a contour that more closely approximates a sphere as compared with the drop contour on the top left. A further holding force reduction moreover takes place as a result of the roughness since, in simple terms, this force can act only at the elevations. If the rough surface 47 is now inclined by the same angle α as in the case of the smooth surface 40, the water drop will run off, entraining the dirt particles 43 (=self-cleaning effect). In an analogous manner, there will be an increase in the anti-adhesive effect. An analogous situation also applies for other drop materials. An item to be fried and cooked or another item to be heated will moreover no longer contact the surface over an extended area, as a consequence of which "burning on" is markedly decreased.

Now the rough surface need not be produced only by the fibre ends that cause the layer surface to "bulge", and fibres running along the layer surface also contribute to the roughness. It is necessary only to produce a textured surface that exhibits spatial frequency fractions (spatial frequency mix) with a stochastic distribution between $3\,\mu m^{-1}$ and $1000\,\mu m^{-1}$.

With this anti-adhesive and cleaning effect, what matters is the spacing of the elevations. Good results are achievable for elevations with a stochastic spacing between 1 µm and 1000 µm. Since the fibres used below, preferably as carbon fibres, have a diameter between 2 µm and 8 µm, in an advantageous manner stochastic fibre spacings between 20 µm and 100 µm are chosen. Spacings in this range yield a fibre quantity that is easy to handle and can be added easily to the layer material.

Fibres of equal length, the fibre length of which is greater than the layer thickness, can also be used. Fibres deviating substantially from the perpendicular (to the mean layer level) will contribute something to the strength of the layer but nothing to the anti-adhesive and cleaning effect if the fibres are enclosed in layer material.

A regular distribution of the fibres can also be produced by aligning them. Alignment can be effected by, for example, vibrating (e.g. with an ultrasound source). Non-conducting fibres can be aligned by means of, for example, direct and alternating electric fields, and ferromagnetic fibres by means of magnetic fields. Fibre alignment is, however, costly; good anti-adhesive, self-cleaning and meshing effects have, however, been achieved with a significantly less expensive stochastic distribution.

If the rough, i.e. uneven, layer top side exhibiting the spatial frequency fractions is no longer the top free surface but is within a coating with two or more layers, meshing with the following layer is obtained. Meshing with the layer below can also take place, if the layer below is softened when the covering layer is applied and the fibre ends then enter into that layer also. The fibres introduced into the layer material lie in a stochastically random orientation. Some fibre ends would thus penetrate the layer surface if a surface tension does not pull the layer material over the fibre ends. The force of the surface tension moreover tries to pull the fibres into the layer again. In order now that a sufficient unevenness can result contrary to the pulling-in as a result of the surface tension, fibres should be present that are longer than the layer thickness to be produced. These also are stochastically distributed; however, there are always some present that also lie approximately in the direction of the surface vector, i.e. about perpendicular to the mean layer level to be produced. For production of this uneven surface, at least twenty percent by weight of the fibres should exhibit a fibre length that is at least five percent longer than the layer thickness. The maximum fibre length is given by the layer thicknesses specified below and a maximum elevation in the layer thickness profile caused by the fibres, less a material covering due to the surface tension. The surface tension of the layer material in question can be obtained from the data sheets or determined in a simple manner experimentally.

As a covering layer, preferably an anti-adhesive layer material, such as polytetrafluoroethylene (PTFE), perfluoroalkoxy (PFA), fluorinated ethylene propylene (FEP) or analogous materials, is used, an increased resistance to scratching being provided as a result of the embedded fibres, and a self-cleaning effect being caused and an anti-adhesive effect being reinforced as a result of the roughening of the surface produced by the fibres. Preferably, diamonds are embedded in the covering layer to support the mechanical hardness.

Various coatings can be used, depending on specific quality requirements.

Proceeding from the surface of the base body, four proven, different coatings are proposed; other coatings are of course usable:

I. Hard-material layer—adhesion-promoting layer—intermediate layer—anti-adhesive layer II. Hard-material layer—adhesion-promoting layer—anti-adhesive layer III. Adhesion-promoting layer—intermediate layer—anti-adhesive layer IV. Adhesion-promoting layer—anti-adhesive layer The thicknesses of the individual layers should be chosen in such a way that, as far as possible, a self-contained layer is formed on application and that the layer is not too thick, in order to keep the use of material within limits, to prevent a time for hardening from increasing unnecessarily, and to guarantee an appropriate adhesiveness and stability. 5 µm to 150 µm have proven themselves as layer thicknesses.

The admixed fibres should, as already set out above, produce an uneven surface that can also mesh with a layer to be applied subsequently. To obtain good meshing, a self-cleaning effect or a reinforcement of the anti-adhesive effect, fibres are used that exhibit a length, that produce spatial frequency fractions with peaks and troughs in the surface profile of a fibre-bearing layer that lie, stochastically distributed, 0.1 µm to 500 µm above a mean flat surface profile. These peaks have preferably a mutual stochastic spacing between 50 nm and 500 µm.

The fibres are added to the layer material, in which they are contained and produce a surface with the above-specified spatial frequency fractions, before, after or during the application. The application of the layer takes place in a horizontal orientation of the layer to be coated or of the base body. Since the layer material is preferably paste-like, it has a certain viscosity $\eta$.

The viscosity $\eta$ is given in Pas (pascal seconds= $Nsm^{-2}$=kg/ms). The higher the value for $\eta$, the more viscous the material. Now, how markedly the surface is profiled by fibres contained in a layer material in the case of a horizontal orientation depends substantially:

on the fibre thickness,
on the fibre density, and
on the viscosity referred to the specific weight of the paste-like layer material, that is to say, the kinematic viscosity, and
on the surface tension of the layer material.

The viscosity and thus also the surface tension are generally temperature-dependent; i.e. viscosity and surface tension will generally change during a hardening process of the layer. Since the "sinking-in" ("oozing-in") of the layer material as a consequence of the viscosity present is time-dependent, the period until hardening of the layer should also be taken into account for the spatial frequency fractions to be achieved. Fibre density and dimensions of the fibres will therefore be determined experimentally, with reference to the layer material to be used, as a function of the process parameters (hardening).

In order that the layer material exhibiting the fibre material contains no gas bubbles, the object base body (e.g. kitchen appliance) just provided with the fibre-containing layer can be exposed to a reduced ambient pressure to outgas the layer.

Mechanical vibration frequencies can also be used to that end. It should, however, be noted in that case that a pressure reduction and any imposed vibration in the still unhardened layer state can change the spatial frequency fractions (spatial frequency mix) or the "amplitude" (peaks and troughs of the surface profiles). This influence also can be determined with a few simple expertly performed experiments.

Various fibres can be used. However, when a fibre is being selected, it should be ensured that the fibrous material meets requirements relating to use with foodstuffs, as required in the case of kitchen appliances, since the fibres are used in a layer of a coating of a kitchen appliance. Good results have been achieved with carbon fibres as a fibrous material. Carbon fibres have an excellent stability, and buckling stability in particular. Furthermore, carbon fibres are light, and they contain tensides, so that they guarantee good embedding in the layer material.

Of course, instead of (carbon) fibres, so-called (carbon) tubes can also be used.

From the following detailed description and the entirety of the patent claims there emerge further advantageous embodiments and combinations of features of the invention.

BRIEF DESCRIPTION OF THE DRAWINGS

The drawings used for explaining the exemplary embodiments of the invention show, in FIG. 1, a schematic representation of a liquid drop on a flat, smooth surface and a rough surface, these surfaces having one time a horizontal orientation and another time a same orientation inclined by an angle α with respect to the horizontal, FIG. 2, a greatly enlarged cross-section through a base body of a kitchen appliance, on which a coating lies, the coating having an adhesion-promoting layer, which is mixed with fibres, directly on the base body, and an anti-adhesive layer lying on the adhesion-promoting layer, and FIG. 3, a variant of a coated kitchen appliance analogous to FIG. 2 with a coating that exhibits a hard layer, an adhesion-promoting layer, an intermediate layer and an anti-adhesive layer.

DESCRIPTION OF THE PREFERRED EMBODIMENTS

Figure 1:
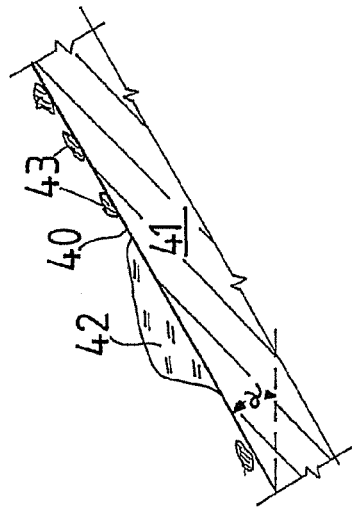
Figure 1:
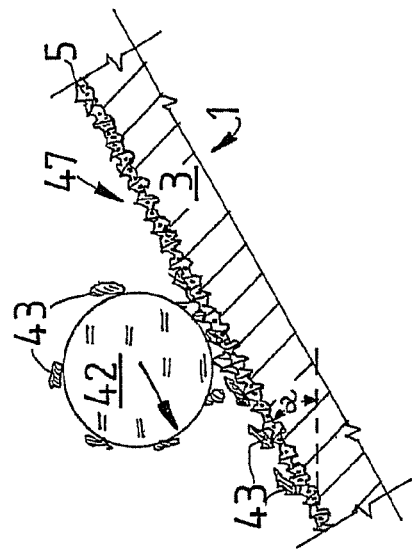
Figure 1:
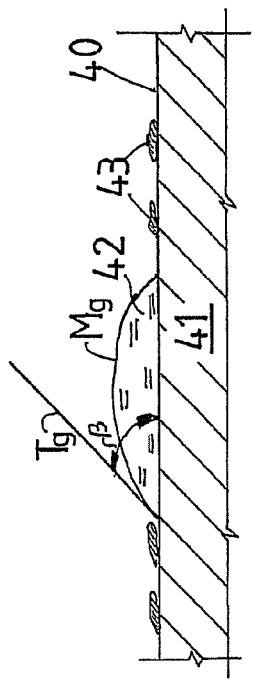
Figure 1:
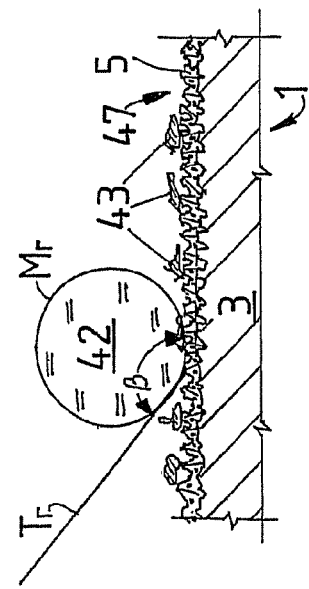
Figure 2:
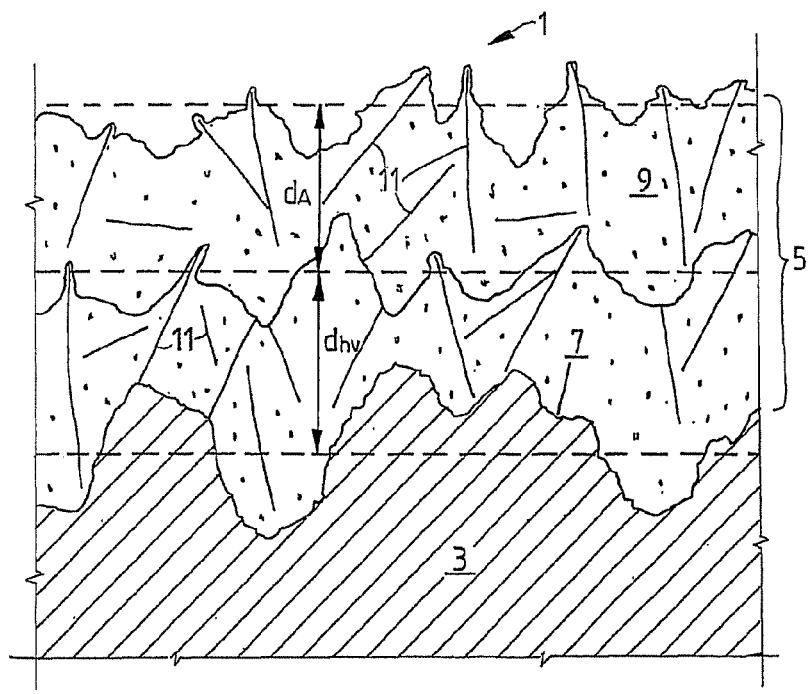

In FIG. 2, a coated kitchen appliance 1 (object base body) is represented in cross-section. The kitchen appliance 1 can be a pan, a pot, a baking tray, a casserole or also an iron, a heating plate of an ironing machine etc.

The kitchen appliance 1 has a roughened base body 3, on which a coating 5 is applied, which has a good adhesiveness on the surface of the base body and the free surface of which has an anti-adhesive effect. The basic body is generally made of an aluminum alloy or steel; other metals are, however, possible.

In accordance with the invention, the coating consists of at least one layer, and here of two layers, namely an adhesion-promoting layer 7 and an anti-adhesive layer 9. Embedded in the adhesion-promoting layer 7 are fibres 11. The fibres 11 have different lengths and a different orientation within the adhesion-promoting layer 7. The length of the fibres 11 is, however, chosen in such a way that at least twenty percent of the fibres 11 have a length that is longer, by at least five percent, than the mean layer thickness $d_{hv}$ to be produced of the adhesion-promoting layer 7. Carbon fibres are used as fibres 11 here. Carbon fibres have the advantage of great stability and "food-fastness". The thickness $d_{hv}$ of the adhesion-promoting layer 7 is typically between 5 μm and 50 μm and has been chosen here as, for example, 40 μm. The fibres 11 typically have a length between 20 μm and 100 μm.

As a material for an adhesion-promoting layer 7, a product with the code 7131 from the Whitford company or a material with the code 459-415 of the DuPont company, for example, can be considered. In the two exemplary materials, ceramic particles, e.g. made from aluminum dioxide ($Al_2O_3$), with a diameter from 5 μm to 40 μm can be added.

On the adhesion-promoting layer 7 lies an anti-adhesive layer 9 with a mean layer thickness $d_A$ of 7 μm. Analogously to the adhesion-promoting layer 7, the anti-adhesive layer 9 also contains fibres 11. The fibres 11 were here chosen, for example, to be the same in both layers for the sake of simplicity in manufacture. However, fibres of different thicknesses and of different fibrous materials can be used in the layers. The fibre lengths depend on the layer thickness to be achieved. As a material of the anti-adhesive layer 9, a material with the code 7333 from Whitford or with the code 456-401 from DuPont, for example, can be used. Other similar materials can of course also be used.

Instead of a coating 5 with an adhesion-promoting layer directly on the surface of the base body 3 and an anti-adhesive layer 9 as a covering layer on the adhesion-promoting layer 7, a coating 21 with a hard layer 25, an adhesion-promoting layer 27, an intermediate layer 29 and an anti-adhesive layer 31 can also exist. Coatings in which the intermediate layer and also the hard-material layer are not present can also be applied on the base body. The intermediate layer 29 is generally a corrosion-inhibiting layer.

Figure 3:
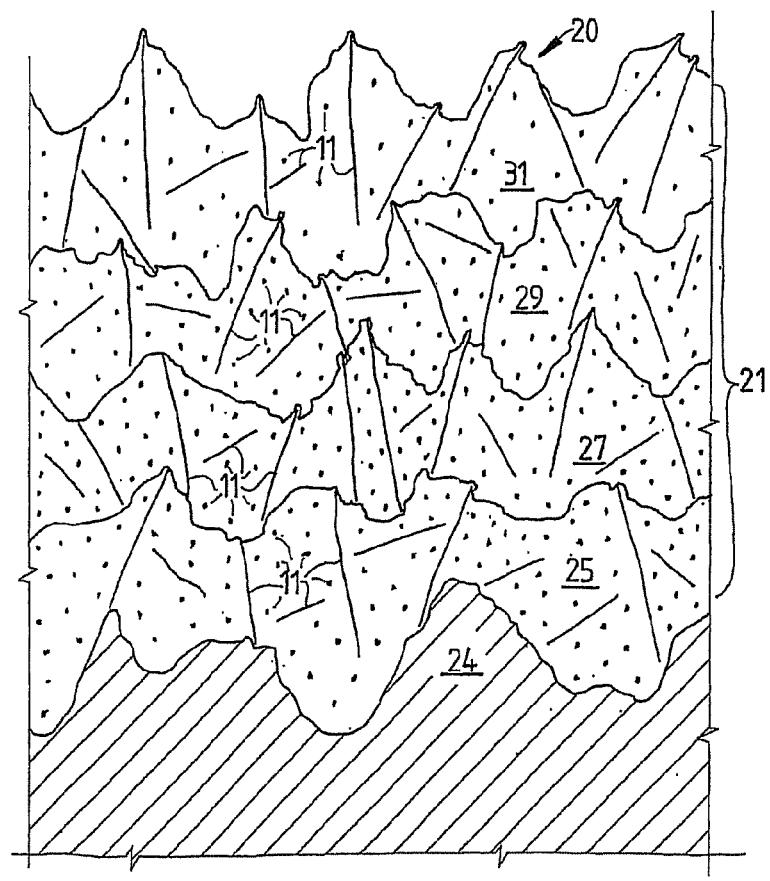

The coated kitchen appliance 20 represented in FIG. 3 likewise has, analogously to the kitchen appliance 1 represented in FIG. 2, a coating, denoted here by 21, which is arranged on the surface 23 of a roughened base body 24. Unlike the two layers 7 and 9 of the coating 5, the coating 21 here has four layers, namely a hard layer 25 lying on the base body 24, then an adhesion-promoting layer 27, then an intermediate layer 29 and finally an anti-adhesive layer 31.

The hard-material layer 25 is applied by a thermal spraying process and here consists of, for example, a mixture of one hundred to sixty percent by weight of aluminum oxide ($Al_2O_3$) and zero to forty percent by weight of titanium dioxide ($TiO_2$). Such hard layers are described in, for example, EP 1 048 751. Instead of aluminum oxide and titanium dioxide as the material of the hard layer 25, other ceramic oxides, nitrides, carbides, oxynitrides or carbo-oxynitrides of one or more elements from the chemical groups IVb to VIb, of aluminum, of nickel, of silicon and mixtures thereof can also be used. Group IVb includes titanium (Ti), zirconium (Zr) and hafnium (Hf). Group Vb includes vanadium (V), niobium (Nb) and tantalum (Ta). Group VIb includes chromium (Cr), molybdenum (Mo) and tungsten (W).

The adhesion-promoting layer 27 and the anti-adhesive layer 31 are formed analogously to the adhesion-promoting layer 7 and the anti-adhesive layer 9.

As an intermediate layer, a material with the code 7232 from the Whitford company or with the code 456-605 from the DuPont company, for example, can be used.

Fibres, in particular carbon fibres, can now be contained, in accordance with above prescriptions, in all the layers 25, 27, 29 and 31 or only in individual layers.

Carbon fibres are dark. A layer with embedded carbon fibres will thus always exhibit a grey to dark colour, the embedded fibres causing an iridescent optical effect if the layer material is transparent or diffusive. If this iridescent effect is to be prevented, the layer in question will be coloured with a dark pigment. This colouring with a dark pigment has moreover the advantage that layer damage, generally to the anti-adhesive layer, that does not disturb the anti-adhesive effect of the anti-adhesive layer is hardly visible.

A coating process of the kitchen appliance 1 or 20 is described on the basis of the production of a four-layer coating 21. This coating 21 contains all the layers explained above. If coatings with fewer layers are to be manufactured, the appropriate process steps should be omitted.

In a first process step, the base body 24 of the kitchen appliance 20, e.g. a bottom of a pan, is pretreated for the coating now to be carried out. For this, the surface is degreased and sandblasted with corundum powder. The corundum powder has fine grains with which coarse grains are admixed. The coarse grains produce a roughness of about one hundred to two hundred micrometers on the surface to be coated. A fine roughness of about ten to thirty micrometers is superposed on this coarsely roughened surface texture by the finer grains.

For production of the hard layer 25, after the roughening, the entire kitchen appliance (e.g. a pan, without the handle and other fittings of course) is brought to a temperature below 600° C. in a kiln. Preferably a temperature from 300° C. to 450° C. is chosen. Immediately after this temperature is reached, a mixture with 100 to 60 percent by weight of aluminum oxide ($Al_2O_3$) and 0 to 40 percent by weight of titanium dioxide ($TiO_2$) is applied. For example, about sixty percent by weight of aluminum oxide and forty percent by weight of titanium dioxide are applied here as a homogeneous mixture with admixed carbon fibres 11 in a plasma spraying process as a thermal spraying process.

The applied hard layer 25 looks black.

The carbon fibres also can contain diamond crystals, which increase their hardness and also their thermal conductivity.

In simple terms, the aluminum oxide, as a relatively inexpensive material, gives the hard layer 25 the necessary hardness, while titanium dioxide, together with the carbon fibres 11, gives this hard layer 25 the ductility and the dark or black colour. As a result of the ductility of the titanium dioxide, a good resistance of the coating to large temperature fluctuations, as occur in frying pans, is provided. The carbon fibres 11 produce an uneven top side of the hard layer 25 and engage with the uneven top side of the base body 24 that resulted from the roughening.

After the spraying-on of the hard layer 25, the kitchen appliance is allowed to cool down. The adhesion-promoting layer 27 is applied on the hard layer 25. The layer material is present as a suspension. The above-mentioned fibres 11 and also a dark pigment can be admixed with this suspension. A layer thickness of several micrometers is applied. This suspension enters into the roughness and the pores of the hard layer 25. Subsequently, the kitchen appliance is heated in a kiln in several stages (100° C., 250° C., 400° C. to 400° C. to 430° C. and maintained at the final temperature for about ten to fifteen minutes.

In an analogous process, the intermediate layer 29 is subsequently applied.

As an anti-adhesive covering layer 31, one to three layers of a fluoropolymer, preferably PTFE (polytetrafluoroethylene), are applied as a suspension after the kitchen appliance has cooled down to room temperature. This suspension likewise enters into a still remaining roughness and into the pores. After the application, a heating programme analogous to that of the layer 27 is run. As a result of the fact that here also the final temperature is maintained for ten to fifteen minutes, baking of the PTFE takes place. The softening temperature of the PTFE is around 360° C. The temperature of the object is thus significantly above this temperature during baking, so that the suspension particles are sintered to form a tough, elastic layer. As a result of the sintering, an elastic PTFE covering layer 31 is formed, which, with a layer thickness of two to ten micrometers, conforms well to the remaining roughness of the intermediate layer 29 below.

In the kitchen appliance with finished coating, preferably the outermost, free surface will be subjected to a brushing process. In this brushing, fibre ends projecting too far are removed in order that these ends do not break off only on typical usage. The broken-off fibre parts are harmless to health but, when the pan is used new, could, on close inspection, leave traces on a light-coloured item being fried. A brush is used the brush hardness of which does not scratch the coating surface but breaks off fibre ends projecting too far. Fibre ends projecting too far are understood to mean fibre ends that would break off on use of a soft spatula as is used in the case of anti-adhesive-coated kitchen appliances.

Surfaces of irons, pots, surfaces of machine parts such as bearing shells, . . . can, instead of frying pans as kitchen appliances, also be coated with the above-described coatings.

Instead of applying the adhesion-promoting layer 27, intermediate layer 29 and the anti-adhesive layer 31, which each are present as suspensions, as individual layers and heating them in stages, the adhesion-promoting layer 27, the intermediate layer 29 and then the anti-adhesive layer 31 can be applied one after the other after surface drying only. These layers 27, 29 and 31 can then be heated together, as described above, in stages or in an approximately continuously increasing manner.

As a layer material in which the fibres can lie, a hard material with an anti-adhesive effect can also be used. In that case, after roughening of the kitchen appliance bottom to be coated, the entire object (e.g. pan) is brought to a temperature below 600° C. in a kiln. Preferably a temperature of 450° C. is chosen. Immediately after this temperature is reached, a mixture with 80 to 40 percent by weight of aluminum oxide ($Al_2O_3$) and 20 to 60 percent by weight of titanium dioxide ($TiO_2$) is applied. For example, approximately sixty percent by weight of aluminum oxide and forty percent by weight of titanium dioxide with an admixture of five to ten percent by weight of aluminum fluoride ($AlF_3$) are applied here as a homogeneous mixture in a plasma spraying process as a thermal spraying process. The admixed aluminum fluoride produces an anti-adhesive effect in the hard layer 7. The use of aluminum fluoride is not obligatory; other materials with an anti-adhesive effect can also be used. However, compatibility with the aluminum oxide/titanium dioxide mixture should be ensured. The material used must also survive under the thermal conditions of the plasma spraying. In the plasma spraying, diamond crystals are admixed that have a diameter between 0.5 μm and 10 μm. The aluminum oxide/titanium dioxide/aluminum fluoride mixture with embedded diamond crystals is sprayed to a layer thickness of 50 μm to 150 μm onto the surface 5. The applied layer can look black.

The admixing of the diamond crystals should take place in such a way that they are not exposed to a temperature above 900° C. At 900° diamond can turn into graphite or burn in the event of oxygen access. The temperature should be kept sufficiently remote from this 900° C.

Admixed diamond crystals improve the thermal conductivity, improve abrasion properties and improve a compatibility of the materials, since they are carbon.

In simple terms, the aluminum oxide, as a relatively inexpensive material, gives the layer 7 the necessary hardness, while titanium dioxide gives this layer 7 the ductility and the dark or black colour. As a result of the ductility of the titanium dioxide, a good resistance of the coating to large temperature fluctuations, as occurring in frying pans, is provided.

What is claimed is:

1. A process for applying at least one layer of material on a metallic object base body of a kitchen appliance, wherein a fibrous material comprising a plurality of carbon fibers is added to the at least one layer of material before, after or during the application of the at least one layer of material, the at least one layer of material is subsequently hardened, and after the hardening, a rough surface with spatial frequency fractions between 3 $\mu m^{-1}$ and 1000 $\mu m^{-1}$ is present, the at least one layer of material defining a top free surface, the plurality of carbon fibers having a plurality of fiber ends sticking out of the top free surface.

2. The process of claim 1, wherein the rough surface is produced as a free coating surface, the roughness of the rough surface produced by the spatial frequency fractions giving rise to a self-cleaning effect and/or producing an anti-adhesive effect.

3. The process of claim 1, wherein the layer of material with the top free surface is applied over a further intermediate layer that also includes the rough surface, thereby creating an intermediate rough surface between the layer of material and the further layer, the intermediate rough surface producing a layer meshing for an improved layer adhesion.

4. The process of claim 1, wherein, for the at least one layer of material provided for the addition of the fibrous material, a viscous, hardenable layer material is used, which, after the application of the at least one layer of material, a second layer of material is provided on the base body, wherein the second layer of material is hardened, containing the fibrous material, and preferably at least twenty percent by weight of the fibres of the fibrous material to be added have a fibre length that is longer, by at least five percent, than the mean layer thickness to be produced of the second layer of material.

5. The process of claim 1, wherein the at least one layer of material has a viscosity such that, on application of the at least one layer of material containing the fibrous material on the base body or on a second layer of material, the rough surface is provided in a manner that allows the at least one layer of material to sink appropriately towards the surface of the base body, thereby covering the plurality of carbon fibers.

6. The process of claim 1, wherein polytetrafluoroethylene (PTFE), perfluoroalkoxy (PFA) or fluorinated ethylene propylene (FEP) is used as a layer material for a top, free layer and this layer in the coating is produced as the last layer in order that its free layer top surface has an anti-adhesive or self-cleaning effect.

7. The process of claim 1, wherein a plurality of diamond crystals are added to the at least one layer of material.

8. A process for applying at least one layer of material on a metallic object base body of a kitchen appliance, wherein a fibrous material comprising a plurality of carbon fibers is added to the at least one layer of material before, after or during the application of the at least one layer of material, the at least one layer of material is subsequently hardened, and after the hardening, a rough surface with spatial frequency fractions between 3 $\mu m^{-1}$ and 1000 $\mu m^{-1}$ is present, the at least one layer of material defining a surface, the plurality of carbon fibers having a plurality of fiber ends sticking out of the surface.

9. The process of claim 8, wherein the surface is at least one of an exposed surface with exposed fiber ends and a non-exposed surface with fiber ends that mesh with a following layer.

* * * * *